United States Patent
Wu et al.

(10) Patent No.: US 9,072,149 B2
(45) Date of Patent: Jun. 30, 2015

(54) LED DRIVING DEVICE WITH OPEN CIRCUIT PROTECTION AND COLOR TEMPERATURE AND BRIGHTNESS ADJUSTMENT

(71) Applicant: UNITY OPTO TECHNOLOGY CO., LTD., New Taipei (TW)

(72) Inventors: Chih-Hsien Wu, New Taipei (TW); Wei Chang, New Taipei (TW); Huan-Ying Lu, New Taipei (TW); Kai-Cheng Chuang, New Taipei (TW); Shao-Wei Chiu, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 9 days.

(21) Appl. No.: 14/085,984

(22) Filed: Nov. 21, 2013

(65) Prior Publication Data

US 2015/0097489 A1 Apr. 9, 2015

(30) Foreign Application Priority Data

Oct. 4, 2013 (TW) .............................. 102218640 U

(51) Int. Cl.
*H05B 37/00* (2006.01)
*H05B 41/00* (2006.01)
*H05B 33/08* (2006.01)

(52) U.S. Cl.
CPC ........ *H05B 33/0887* (2013.01); *H05B 33/0827* (2013.01); *H05B 33/083* (2013.01); *H05B 33/0845* (2013.01); *H05B 33/0857* (2013.01)

(58) Field of Classification Search
CPC ................................. H05B 41/46; H05B 41/00
USPC ......................................................... 315/122
See application file for complete search history.

(56) References Cited

U.S. PATENT DOCUMENTS

| | | | |
|---|---|---|---|
| 7,804,256 B2 * | 9/2010 | Melanson ...................... 315/291 |
| 2011/0210678 A1 * | 9/2011 | Grajcar ........................... 315/192 |
| 2012/0112648 A1 * | 5/2012 | Hariharan ...................... 315/186 |
| 2013/0021580 A1 * | 1/2013 | Morgan et al. .................. 353/31 |
| 2013/0038222 A1 * | 2/2013 | Yeh et al. ....................... 315/152 |
| 2013/0241427 A1 * | 9/2013 | Kesterson et al. ............. 315/210 |

* cited by examiner

*Primary Examiner* — Anh Tran
(74) *Attorney, Agent, or Firm* — Rosenberg, Klein & Lee

(57) ABSTRACT

An LED driving device with open circuit protection and color temperature and brightness adjustment is applied in a lamp to drive LEDs which are divided into strings, and at least one string is formed by connecting blue light diodes in series, and the remaining strings are formed by connecting yellow light LEDs in series, and at least one of the yellow light strings is connected to the blue light string in parallel and then connected to the remaining strings in series to form a node. The LED driving device employs a switch to conduct the blue or yellow light string to change the color temperature of the emitted light of the lamp, and a power input pin of a control chip is electrically coupled to the node. If there is an open circuit caused by an abnormality of the LEDs, the operation will be stopped to provide protection.

5 Claims, 4 Drawing Sheets

LED DRIVING DEVICE WITH OPEN CIRCUIT PROTECTION AND COLOR TEMPERATURE AND BRIGHTNESS ADJUSTMENT

CROSS-REFERENCE TO RELATED APPLICATIONS

This non-provisional application claims priority under 35 U.S.C. §119(a) on Patent Application No(s). 102218640 filed in Taiwan, R.O.C. on Oct. 4, 2013, the entire contents of which are hereby incorporated by reference.

BACKGROUND OF THE INVENTION

1. Field of the Invention

The present invention relates to the technical field of a power supply device used in a light emitting diode (LED) lamp, and more particularly to the LED driving device with open circuit protection and color temperature and brightness adjustment, and a simple jump is provided for flexibly adjusting the light color of the lamp to enhance the adaptability of the product.

2. Description of the Related Art

At present, most LED lamp driving devices employ a switching power converter as the main circuit architecture, and the switching power converter generally includes a flyback, forward, boost, buck, push-pull, half-bridge or full-bridge circuit. For instance the driving device 1 as shown in FIG. 1 adopts a boost power converter as the main circuit architecture to provide the function of increasing the input voltage to a voltage level required by a load, and the boost power converter comprises a dimming module 10, a rectification module 11, a control module 12 and an output module 13, wherein the control module 12 includes a control chip 120, a protection resistor 121, the transistor 122 and the sensing resistor 123. The dimming module 10 is a tri-electrode AC switch (TRIAC), and the sensing resistor 123 is coupled to the LED through the transistor 121, such that when the TRIAC switches a conduction angle of the input voltage to adjust the brightness, the sensing resistor 123 senses a driving current of the LED to form a voltage drop provided for the control chip 120 to compare the voltage drop with the input voltage to output a high level voltage or a low level voltage to the transistor 122, so as to conduct or cut off the transistor 122 timely to control the duty ratio of a pulse width modulation (PWM) signal and the intensity of the outputted driving current, and affect the brightness of the LED. To prevent the driving device 1 from being damaged by an overvoltage of the circuit, the control chip 120 intercepts the driving voltage outputted from the output module 13 through the protection resistor 121 to determine whether the operation of the overall circuit is normal. However, if an LED of the aforementioned LED string is damaged to form an open circuit, the remaining LEDs will receive the whole voltage outputted by the output module 13 directly, so that these LEDs may be able to work normally, but they may be damaged by the over-voltage after a certain period of time of the operation, and the service life of the lamp will be reduced or the product quality or user satisfaction will be lowered.

In addition, the conventional lamps adopts a combination of the blue light LED and the yellow light LED to produce the required light color of the lamps, but the number of blue light LEDs and yellow light LEDs is determined at the stage of research and development, and users cannot make any adjustment (or increase/decrease the number of blue light LEDs or yellow light LEDs in practical applications) afterwards even the produced lamps may have a light color problem due to the physical properties of different LEDs. Therefore, related manufacturers may have to eliminate the products with the issues of color difference during the inspection before shipping out the product and thus resulting in a poor yield rate and increase the inventory of secondary-quality products.

In view of the aforementioned problems, it is a main subject for the present invention to use a combination of blue and yellow light LEDs in the lamp as the light source, while using a simple switch to flexibly adjust the light color of the lamp before shipping the lamp in order to achieve the effects of assuring the product quality, reducing the defective rate and production cost, and achieving the cost-effectiveness.

SUMMARY OF THE INVENTION

In view of the aforementioned drawbacks of the prior art, it is a primary objective of the present invention to overcome the drawbacks by providing an LED driving device with open circuit protection and color temperature and brightness adjustment, wherein a simple circuit and switch components are used to provide a light color fine-tune function and an open circuit protection function, so that the product adaptability and quality can be improved without increasing the cost.

To achieve the aforementioned objective, the present invention provides an LED driving device with open circuit protection and color temperature and brightness adjustment, and the LED driving device is used in a lamp such as a recessed light or a down light to drive a plurality of LEDs to emit light. The LED driving device consists of a dimming module, a rectification module, a control module and an output module, and the control module includes a control chip installed therein, electrically coupled to the LEDs, and electrically coupled to the output module through a transistor and a sensing resistor, characterized in that the LEDs are divided into a plurality of strings, and at least one of the string is formed by coupling a plurality of blue light diodes in series and the remaining strings are formed by coupling a plurality of yellow light LEDs is series, and a cathode terminal of at least one of the yellow light strings is coupled to a cathode terminal of the blue light string to form a node; and the output module includes a switch which is a three-way element with two output terminals coupled to the blue light string and the yellow light string respectively, and a power input pin of the control chip is electrically coupled to the node, such that when the LEDs are open circuited by an abnormality, the voltage level at the node is lower than the working voltage of the control chip, and the control chip stops operating to produce the effect of protecting the whole circuit, and the switch is switched to conduct the blue light string the yellow light string to change the color temperature of the emitted light of the lamp.

Wherein, when the dimming module receives/outputs a dimming signal, the control chip adjusts the operation of the transistor to adjust the intensity of the current flowing in the LEDs to change the illumination intensity of the lamp. The LED driving device the LED driving device employs a boost power conversion circuit architecture. The switch is a jump installed on a lamp panel of the lamp, and the rectification module is a full-wave bridge rectifier, and the dimming module is a TRIAC for receiving and adjusting an input phase conduction angle of an external power supply to change an input power and generate the dimming signal.

In summation, the present invention uses the jump to change the conduction status of the blue or yellow light string and allows manufacturers to flexibly adjust the light color before shipping out the lamps in order to achieve the effects of meeting order requirements and reducing defective rate and the inventory of secondary level products. In the meantime, the method of connecting through the node allows the control chip to obtain the required working voltage directly from the LEDs. Unlike the conventional way of using resistors to divide and rectify the voltage to produce the working voltage, the present invention provides a protection effect when the LED is damaged to an open circuit, and the control chip fails to obtain the required working voltage through the node, and the whole circuit stops operating.

DETAILED DESCRIPTION OF THE PREFERRED EMBODIMENTS

The aforementioned and other objectives, technical characteristics and advantages of the present invention will become apparent with the detailed description of preferred embodiments and the illustration of related drawings as follows.

Figure 1:
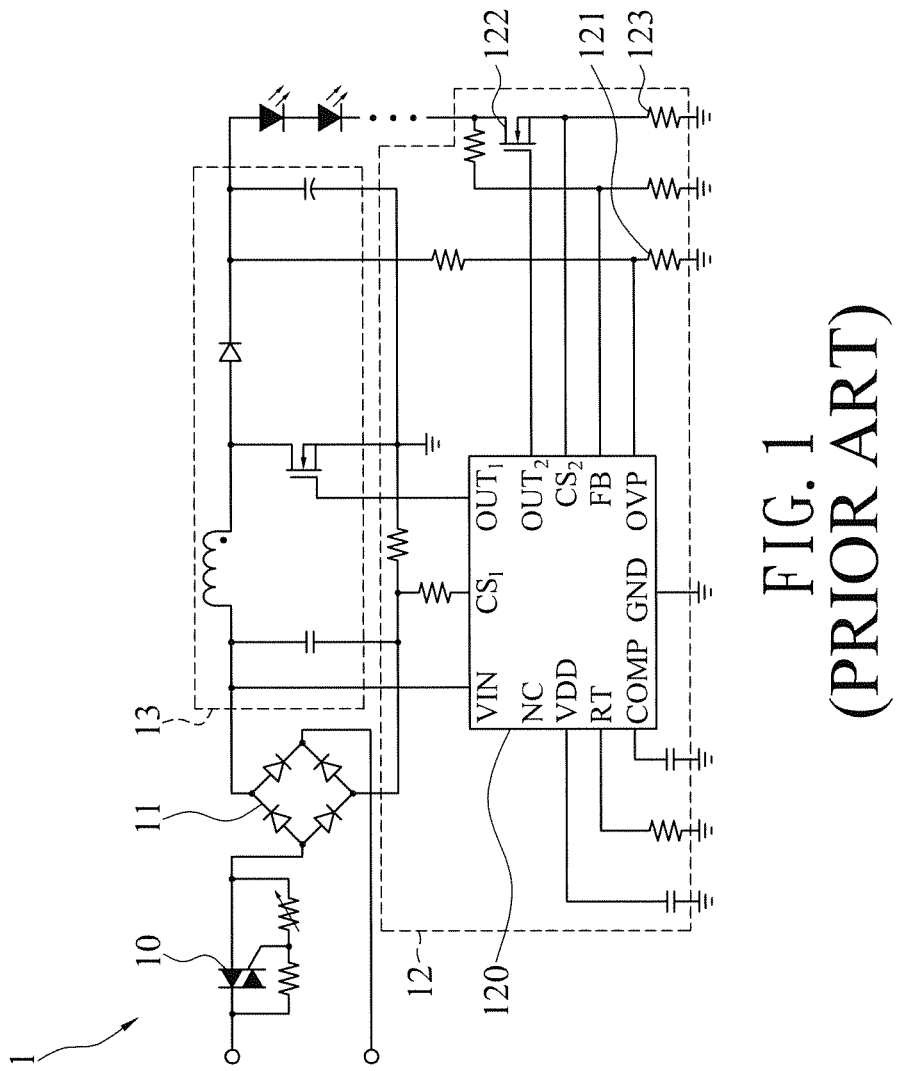
FIG. 1 is a circuit diagram of a conventional boost driving device.
Figure 2:
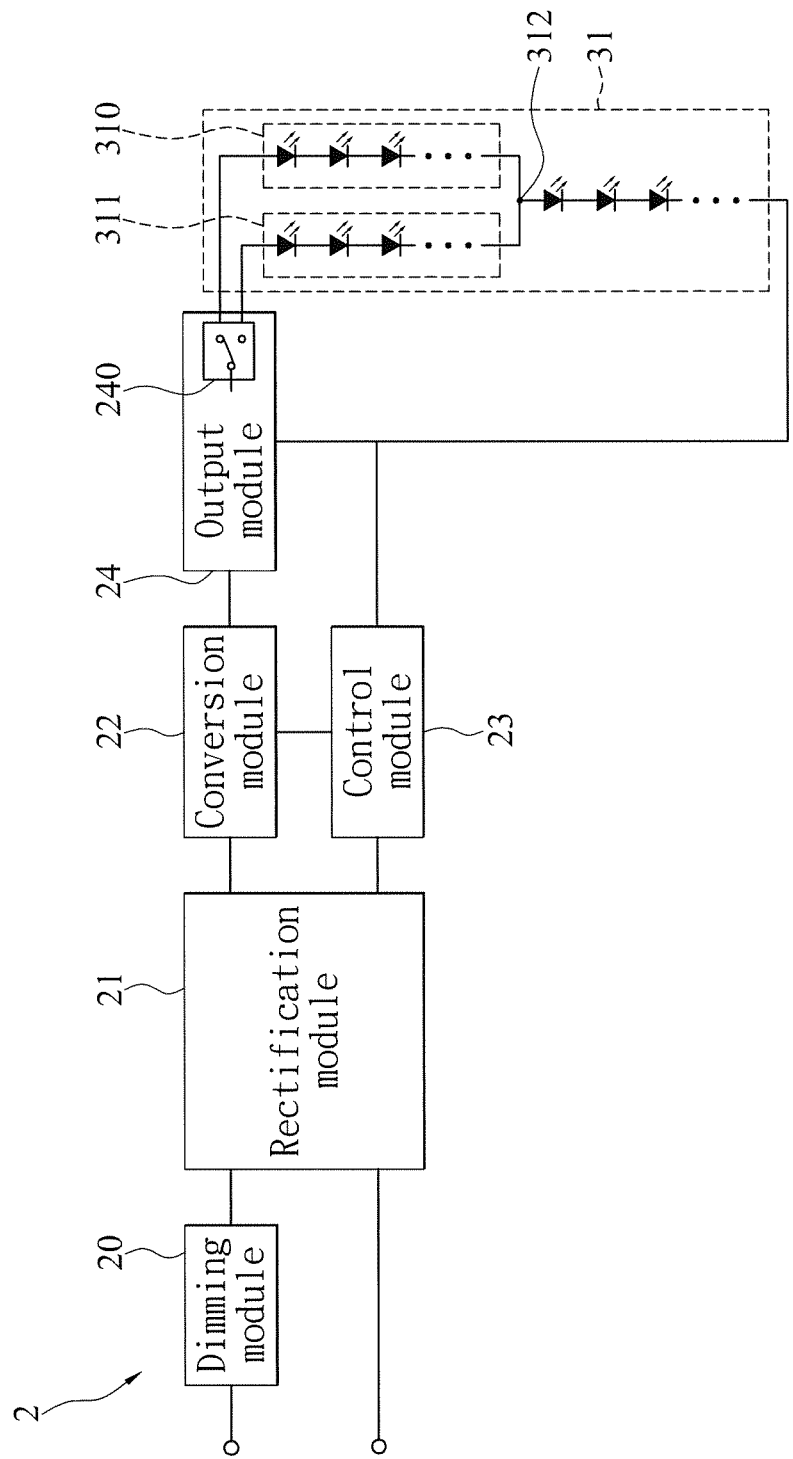
FIG. 2 is a schematic block diagram of a preferred embodiment of the present invention.
Figure 3:
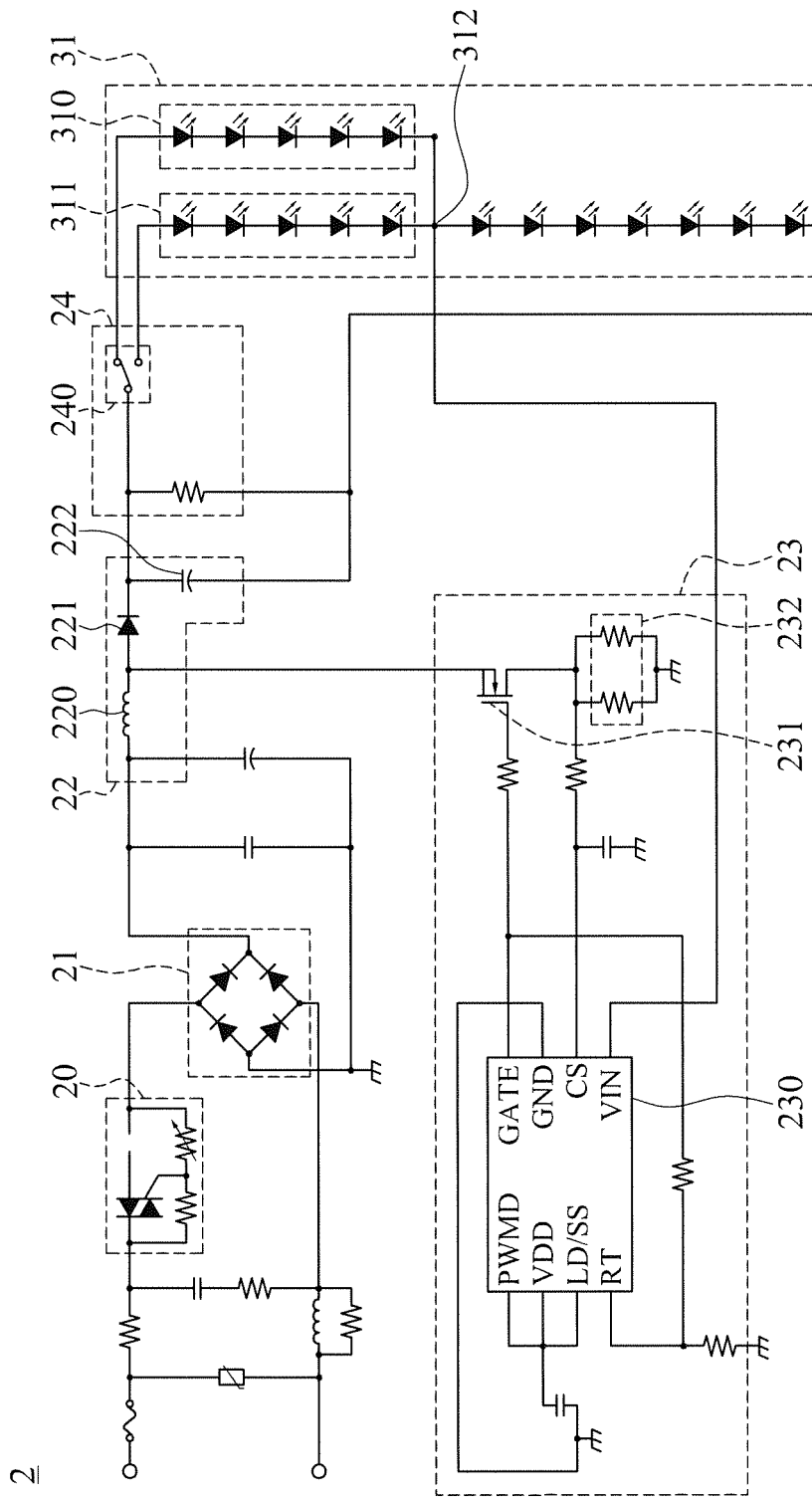
FIG. 3 is a circuit diagram of a preferred embodiment of the present invention.
Figure 4:
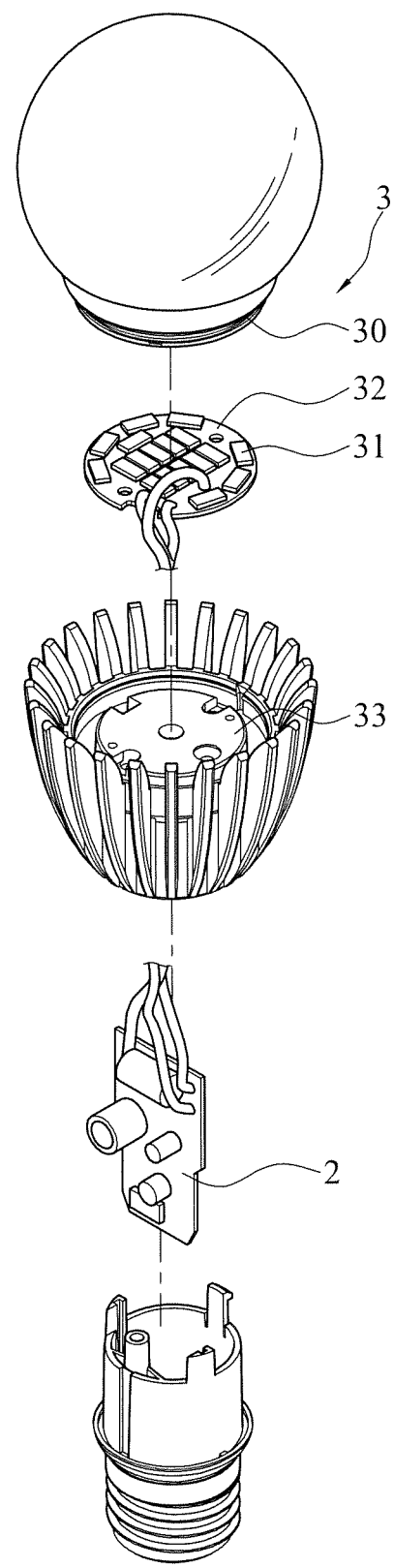
FIG. 4 is a schematic view of a lamp of a preferred embodiment of the present invention.

With reference to FIGS. 2 to 4 for a block diagram, a circuit diagram and a schematic view of a preferred embodiment of the present invention respectively, an LED driving device 2 with open circuit protection and adjustable color temperature and brightness is used in a lamp 3 such as a recessed light or a down light to drive a plurality of LEDs 31 to emit light, and the lamp 3 comprises a lampshade 30, a lamp panel 32 and a lamp holder 33, and the lamp holder 33 is provided for accommodating the lamp panel 32 and then coupling the lampshade 30, and the lamp panel 32 electrically coupled to the LED driving device 2 and includes the LEDs 31 installed thereon, and the LEDs 31 are divided into a plurality of strings, and at least one string is formed by coupling a plurality of blue light LEDs in series to produce a blue light string 310, and the remaining strings are formed by coupling a plurality of yellow light LEDs in series. In addition, a cathode terminal of at least one of the yellow light strings (which is yellow light string 311) is coupled to a cathode terminal of the blue light string 310 to form a node 312.

The LED driving device 2 employs a boost architecture consist of a dimming module 20, a rectification module 21, a conversion module 22, a control module 23 and an output module 24. The dimming module 20 is a TRIAC, and the rectification module 21 is a full-wave bridge rectifier, and dimming module 20 is electrically coupled to an external power supply via the TRIAC (not shown in the figure), and the conversion module 22 consists of an inductor 220, a diode 221 and a capacitor 222, and the control module 23 includes a control chip 230, a transistor 231 and a sensing resistor 232, and the output module 24 includes a switch 240 of the three-way element. A terminal of the inductor 220 is coupled to an output terminal of the rectification module 21 and the other terminal of the inductor 220 is coupled to an anode of the diode 221, and a cathode of the diode 221 is coupled to the capacitor 222 and an input terminal of the switch 240, and two output terminals of the switch 240 are coupled to the blue light string 310 and the yellow light string 311 respectively. In this preferred embodiment, the switch 240 is a jump installed on the lamp panel 32 and provided for related manufacturers of the lamp 3 to switch the switch 240 and change the conduction status of the blue light string 310 or the yellow light string 311 before shipping out the lamp 3. Therefore, the lamp 3 can emit either a light having cold light color or warm light color based on the status of the LEDs of the blue light string 310 (whether the LEDs are lit or not). In other words, the color temperature of the emitted light of the lamp 3 can be changed.

The control chip 230 has eight pins, respectively: VIN, CS, GND, GATE, PWMD, VDD, LD/SS, and RT, and the GATE pin is electrically coupled to a gate pin of the transistor 231, and the CS pin is electrically coupled to a source of the transistor 231 and the sensing resistor 232, and the VIN pin (which is the power input pin) of the control chip 230 is electrically coupled to the node 312, and a drain of the transistor 231 is coupled to an anode of the diode 221. In addition, the TRIAC receives and adjusts an input phase conduction angle of the external power supply to change the input power and then generate a dimming signal, so that the control chip 230 can adjust the operation of the transistor 231 and the intensity of the current flowing in the LEDs according to the dimming signal, so as to change the illumination intensity of the lamp 3. In the meantime, the node 312 has a voltage value since the LEDs 31 have a current passing through, so that the control chip 230 receives the voltage value to obtain the required working voltage. If there is an open circuit caused by an abnormality of the LEDs 31, the voltage level at the node 312 will be lower than the working voltage of the control chip 230, so that the control chip 230 will be unable to obtain the required working voltage and will stop operating, and the lamp 3 will also stop operation to provide the effects of protecting the LEDs 31 and the whole circuit.

What is claimed is:

1. A light emitting diode (LED) driving device with open circuit protection and color temperature and brightness adjustment, consisting of a dimming module, a rectification module, a conversion module, a control module and an output module, and the control module including a control chip installed therein, electrically coupled to the conversion module and the LEDs, and further electrically coupled to the output module through a transistor and a sensing resistor, characterized in that the LEDs is divided into a plurality of strings, and at least one string is formed by coupling a plurality of blue light diodes in series, and the remaining strings are formed by coupling a plurality of yellow light LEDs in series, and a cathode terminal of at least one of the yellow light strings is coupled to a cathode terminal of the blue light string to form a node; and the output module includes a switch which is a three-way element with two output terminals coupled to the blue light string and the yellow light string respectively, and a power input pin of the control chip is electrically coupled to the node, such that when the LEDs are open circuited by an abnormality, the voltage level at the node is lower than the working voltage of the control chip, the control chip stops operating to produce the effect of protecting the whole circuit, and the switch is switched to conduct the blue light string or the yellow light string to change the color temperature of the emitted light of a lamp.

2. The LED driving device with open circuit protection and color temperature and brightness adjustment according to claim 1, wherein when the dimming module outputs a dimming signal, the control chip adjusts the operation of the transistor to adjust the intensity of the current flowing in the LEDs to change the illumination intensity of the lamp.

3. The LED driving device with open circuit protection and color temperature and brightness adjustment according to claim 2, wherein the LED driving device employs a boost power conversion circuit architecture.

4. The LED driving device with open circuit protection and color temperature and brightness adjustment according to claim 3, wherein the switch is a jump installed on a lamp panel of the lamp.

5. The LED driving device with open circuit protection and color temperature and brightness adjustment according to claim 4, wherein the rectification module is a full-wave bridge rectifier, and the dimming module is a TRIAC for receiving and adjusting an input phase conduction angle of an external power supply to change an input power and generate the dimming signal.

* * * * *